United States Patent Office 3,307,678
Patented Mar. 7, 1967

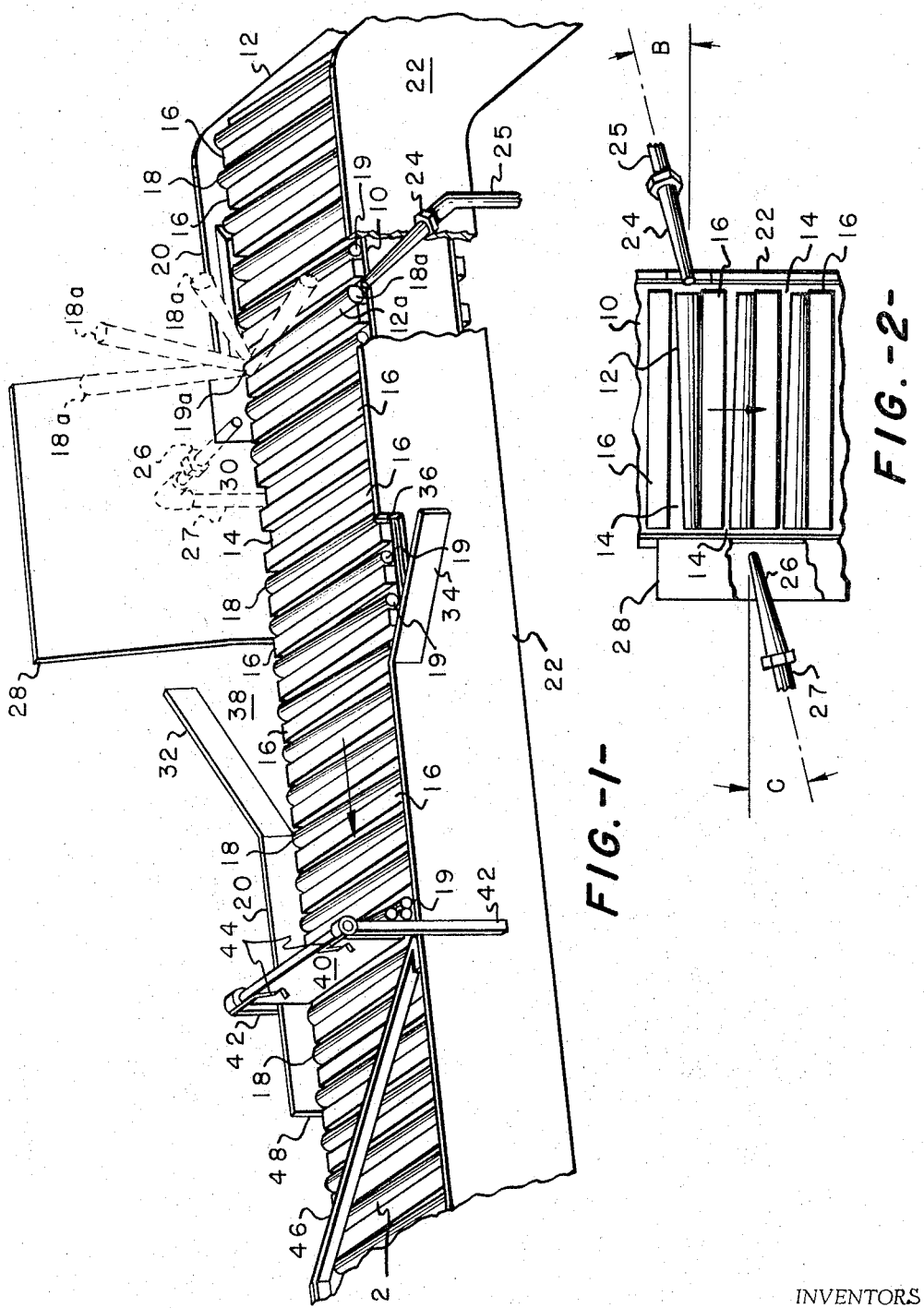

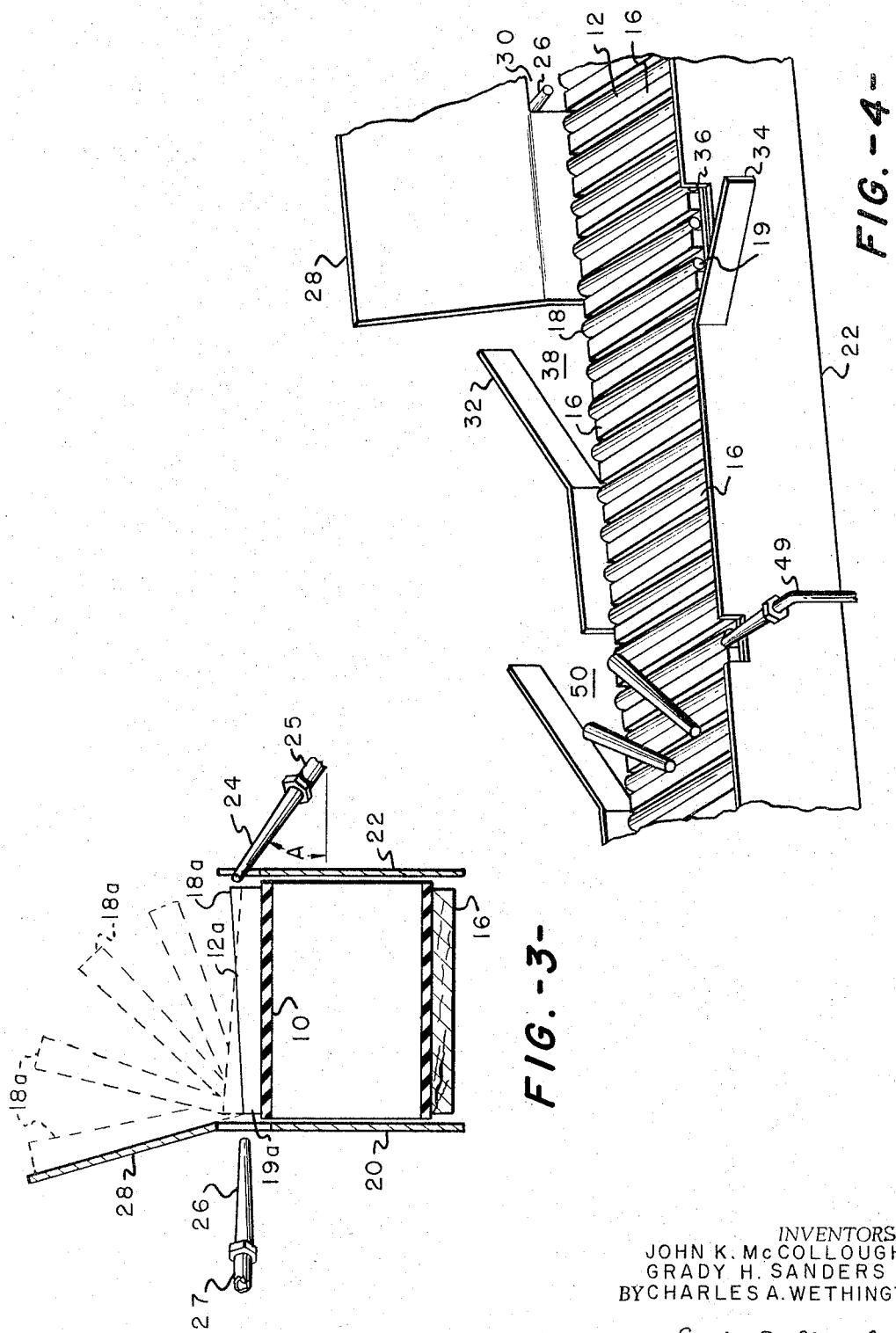

3,307,678
BOBBIN HANDLING APPARATUS
John K. McCollough, Grady H. Sanders, and Charles A. Wethington, Spartanburg, S.C., assignors to Deering Milliken Research Corporation, Spartanburg, S.C., a corporation of Delaware
Filed May 4, 1964, Ser. No. 364,585
20 Claims. (Cl. 198—33)

This invention relates to an object handling apparatus and more particularly to an apparatus for conveying and orienting bobbins or the like, particularly bobbins having one open end thereof larger than the other end.

Bobbin handling, orienting and conveying devices generally are well known in the art as exemplified in U.S. Patent 3,031,059, Ingham, April 24, 1962. These devices receive the bobbins from a hopper and by means of a conveyor transport the bobbins to a point of use. In a majority of textile mills the bobbins employed are hollow with one end larger in diameter than the other end. When these bobbins are placed on the conveying means some of the bobbins are placed with the large end extending in one direction while other bobbins are placed with the large end in the opposite direction on the conveying means. Since the bobbins normally are being conveyed to an automatic loading station it is necessary to provide some means to place the bobbins on the conveying means so that the large ends of all the bobbins extend in the same direction. Prior to this invention the simplest method was to eject the bobbins from the conveying means which are not properly oriented. This method, of course, leaves empty pockets on the conveying means. Under some circumstances this is not a serious limitation but when the conveying means is supplying bobbins to a plurality of loading stations it has been found that the ejection of the improperly oriented bobbins seriously hinders the speed of operation resulting in lowered efficiency of operation.

Therefore, it is an object of the invention to provide an object handling apparatus on which the objects being handled are all oriented in the same direction without leaving an excessive number of empty spaces on the conveying means.

A second object of the invention is to provide a bobbin handling apparatus which conveys and orients all the bobbins in a manner such that the bobbins are aligned parallel to one another and each have the large open end extending in the same direction without leaving an excessive number of empty pockets on the conveyor.

A still further object of the invention is to provide an object handling apparatus which is more efficient in operation due to efficient use of all the available space on the object handling apparatus.

Another object of the invention is to provide a bobbin handling apparatus which efficiently reorients improperly oriented bobbins on the conveyor without ejecting such bobbins back into the bobbin supply hopper.

Other objects and advantages of the invention will be clearly apparent as the specification proceeds to describe the invention with reference to the accompanying drawings in which:

FIGURE 1 is a schematic perspective representation of the overall bobbin handling apparatus;

FIGURE 2 is a top view of the bobbin orienting system shown in FIGURE 1;

FIGURE 3 is a partially sectional view perpendicular to the axis of the conveyor to show the relative position of the air jet which initially acts on the improperly oriented bobbin; and FIGURE 4 is a modification of the invention shown in FIGURES 1-3.

Looking now to FIGURES 1-3 the preferred embodiment is shown in conjunction with a belt conveyor 10 which conveys the bobbins 12 from a hopper (not shown) to a plurality of loading stations (not shown) in the direction indicated by the arrow. As illustrated the bobbins are being oriented in the pockets 14 between the cleats 16 so that the large open end 18 of the bobbin lies adjacent the rear wall 20 of the conveying system and the smaller end 19 of the bobbins 12 lies adjacent the front wall 22 of the conveying system. It is obvious though that the bobbins can be oriented in the opposite direction, if desired, by rearranging the components of the system. Preferably, the bobbins are oriented so that they lie parallel to one another normal to the path of movement of the belt conveyor 10 in order to be able to convey more bobbins per unit time versus an end to end arrangement of the bobbins.

As previously discussed, the conveyor belt 10 is supplying bobbins to a plurality of loading stations such as that shown in U.S. Patent 3,090,476, Sanders, May 21, 1963, and it is necessary for efficient operation of the loading stations that all the bobbins be oriented so that they lie substantially parallel to one another with all the large open ends 18 of each bobbin extending in the same direction. Furthermore, for efficient operation of the plurality of loading stations it is necessary to maintain bobbins in as many pockets 14 as possible. To this end is provided a system which will orient improperly oriented bobbins and maintain the reoriented bobbins in the same pocket 14 between the cleats 16 in which it was improperly oriented.

In operation the bobbins 12 are placed on the conveyor belt 10 from the hopper (not shown) in any suitable manner such as that in U.S. Patent 3,031,059, supra, and are conveyed in the direction indicated by the arrow in FIGURE 1 toward the loading stations (not shown). Located adjacent the conveyor belt 10 are a pair of air jets 24 and 26 supplied with air under pressure through conduits 25 and 27 from a suitable source. Air jets 24 and 26 are spaced from one another in the direction of movement of the belt 10 a predetermined distance and are located on opposite sides of the conveyor belt 10 for reasons set forth hereinafter. A deflector plate 28 is mounted on wall 20 with the air jet 26 directing a jet of air through an opening 30 therein.

Assuming that a bobbin such as bobbin 12a is placed in the pocket 14 in a manner such that the large open end 18a is adjacent the front wall 22 and the smaller end 19a is located adjacent the wall 20, the air jet 24 is placed at an angle A to the plane of the conveyor such that a blast of air will hit the open end 18a of the bobbin 12a and flip it toward the deflector plate 28. The angle A is so selected that it is large enough so that if the bobbin is properly oriented the jet of air from the air jet 24 will not hit the small end 19 of the bobbin but is small enough that the jet of air will hit the upper inside of the larger end of the bobbin and flip it toward the deflector plate 28.

As shown in dotted lines in FIGURE 1 the bobbin 12a will be thrown against the deflector plate 28 in such a manner that the large diameter end 18a will be in the upper position and the smaller diameter end 19a will be in the down position in the pocket 14 adjacent the deflector member 28. Then as the bobbin 12a slides along the deflector plate 28 due to the movement of the conveyor belt 10 the air jet 26 will blow and deflect the lower end 19a of the bobbin 12a toward the front wall 22 in the pocket 14 and allow the larger diameter end 18a to fall into the pocket adjacent the wall 20, thereby placing the bobbin 12a into the desired oriented position on the conveyor belt 10 substantially parallel to the other bobbins 12 on the belt. It has been found that for best operation of the system air jets 24 and 26 should be at angles B and C, respectively, to the cleats 16 with angles B and C being substantially equal. The displacement of the jet 24 at an angle B is to cause the heavier larger diameter end 18a to be thrown ahead of the small diameter end 19a to compensate for the movement of the conveyor belt 10. At the same time the jet 26 is placed at an angle C to blow the bobbin 12a toward the upstream side of the pocket 14 in order to allow sufficient time for the larger diameter end 18a to properly seat itself in the pocket 14.

The relative positions of the air jets 24 and 26 with respect to one another in the direction of travel of the belt depends on many factors such as the speed of the belt and the distance between the center lines of adjacent cleats on the belt. In the preferred form of the invention the air jets 24 and 26 are spaced in the direction of travel of belt from one another a distance approximately equivalent to the distance between the center lines of two adjacent cleats. It has been found that this spacing provides a system in which the speed of the belt can be selected to provide an overall efficient system.

Guide plate 32 on rear wall 20 and guide plate 34 on front wall 22 are provided to guide the bobbins into a central position on the conveyor belt 10. These guide plates 32 and 34 are necessary since in any textile mill there are various sized bobbins varying in weight. The air pressure exerted by the air jets 24 and 26 is preselected for an average size and weight bobbin and is constant. Therefore, undersized and underweight bobbins may be blown across the conveyor belt 10 in such a position that the small diameter end 19a will overhang the front wall 22. When this happens this overhanging small end 19a will ride along the front wall 22 until it reaches the notch 36 and will then drop down into the pocket 14 and be guided inwardly toward the central position of the pocket 14 by the guide plate 34. If an oversized or overweight bobbin 12 should be improperly oriented the air jets 24 and 26 may not be strong enough to blow the bobbin into correct position. The overweight and oversized bobbin then will tend to lean on the deflector plate 28 until the conveyor belt 10 moves it past the deflector plate where the large diameter end 18a will fall into the triangular space 38 and engage the guide plate 34 as the conveyor belt moves downstream. The bobbin 12a will then be guided toward a central position in the pocket 14.

Under some unpredictable conditions due to damaged bobbins, etc., the improperly oriented bobbin will be blown to a position where it straddles several cleats 16 and does not fall into the proper pocket 14. These bobbins will travel downstream until they come into contact with the spring loaded door member 40 supported just above the conveyor belt 10 by support arms 42 welded or otherwise secured to wall members 20 and 22. Springs 44 lightly bias the door member toward the upstream direction. Door member 40 will stop and align the straddling bobbins and allow them to drop into the next empty pocket 14 which passes thereunder.

Under some circumstances more than one bobbin will be stopped by the door member 40 and may tend to jam between the door member 40 and the conveyor belt 10 and cause a stoppage in the running of the belt. The tension of springs 44 is so selected that upon occurrence of a bobbin jam the door member 40 will swing in a downstream direction against the bias of springs 44 and allow the straddled bobbins to pass thereunder. These bobbins will then engage the guide member 46, welded or otherwise secured to the wall members 20 and 22, and be guided off the conveyor belt 10 through notch 48 cut into the wall member 20. Obviously the position of guide member 46 can be reversed so that the notch 48 will be in wall 22, if desired.

Looking now to the modification shown in FIGURE 4, the same elements of FIGURES 1–3 shown in FIGURE 4 will be indicated by the same reference number. The modification of FIGURE 4 is very similar to that shown in FIGURES 1–3 except the door member 40 and the triangular guide member 46 have been eliminated and an additional air jet 49 is substituted therefor. Air jet 49 is so positioned that it will blow any bobbin that is straddling the cleats 16 on the conveyor belt 10 off the belt through notch 50 cut into the rear wall 20. The air jet 49 and the notch 50 can be switched if it is desired to blow the bobbin off the belt through the front wall 22.

The herein disclosed object handling apparatus has many obvious advantages. As previously discussed the reorienting mechanism allows the conveyor system to efficiently supply the required number of bobbins to a multiplicity of loading stations. Furthermore, the herein disclosed system, as long as the hopper is full, maintains substantially all the pockets full at all times. Also, the herein disclosed system will efficiently handle various sized and weight bobbins without constant adjustment of the system.

Although we have described in detail the preferred embodiment of our invention, we contemplate that many changes may be made without departing from the scope or spirit of our invention, and we desire to be limited only by the claims.

That which is claimed is:

1. A material handling apparatus for objects having one open end larger in diameter than the opposite end thereof, said apparatus comprising a conveyor having transversely extending object-receiving recesses formed on its conveying surface, and object reversing means operably associated with said conveyor to reverse and retain improperly aligned objects in said recesses, said object reversing means including air nozzle means and a deflector means, said deflector means being mounted adjacent said conveyor to prevent objects from being thrown off said conveyor as said objects are being reversed by said air nozzle means.

2. The structure of claim 1 wherein said air nozzle object reversing means includes a first air nozzle and a second air nozzle adjacent said conveyor.

3. A material handling apparatus for objects having one open end larger in diameter than the opposite end thereof, said apparatus comprising a conveyor having transversely extending object-receiving recesses formed on its conveying surface, object reversing means operably associated with said conveyor to reverse and retain improperly aligned objects in said recesses, said object reversing means including air nozzle means and a deflector means, said deflector means being mounted adjacent said conveyor to prevent objects from being thrown off said conveyor as said objects are being reversed by said air nozzle means and means downstream from air nozzle object reversing means to remove objects from the top of said recesses which are straddling thereon.

4. The structure of claim 3 wherein said means to remove straddling objects from said conveyor is a deflector member supported adjacent the top of said recesses to engage and guide off said conveyor any object lying on top of said recesses.

5. A bobbin handling apparatus for bobbins having one open end larger in diameter than the opposite end thereof, said apparatus comprising a conveyor having transversely extending bobbin-receiving recesses formed on its conveying surface, a first air nozzle means on one side of said conveyor, a second air nozzle means on the other side of said conveyor, means supplying air under pressure to said first and second air nozzle means, means supporting said first air nozzle means at an angle to said conveyor whereby the air from said first air nozzle means will impinge on the large diameter end of a bobbin and flip it out of said recesses but will pass over the small diameter end of a bobbin, and means supporting said second air nozzle means in a position so that the air issuing therefrom will impinge the small diameter end of a bobbin flipped out of said recess by said first air nozzle means and return the bobbin to said recess in reversed position.

6. The structure of claim 5 wherein said second air nozzle means is supported downstream of said first air nozzle means in the direction of movement of said conveyor.

7. The structure of claim 6 wherein a deflector means is operatively associated with said conveyor and is mounted adjacent said second air nozzle means to prevent the bobbins flipped by said first air nozzle means from falling off said conveyor and to guide the flipped bobbins into the jet of air issuing from said second nozzle means.

8. The structure of claim 7 wherein bobbin removal means are provided downstream of said first and second air nozzle means to remove bobbins from said conveyor which straddle said recesses.

9. The structure of claim 8 wherein said bobbin removal means is an auxiliary air jet supplied with air under pressure directing a stream of air adjacent the top of said recesses.

10. A material handling apparatus for objects having one open end larger in diameter than the opposite end thereof, said apparatus comprising a conveyor having transversely extending object-receiving recesses formed on its conveying surface, and object reversing means operably associated with said conveyor to reverse and retain improperly aligned objects in said recesses, said object reversing means including a first air nozzle means and a second air nozzle means adjacent said conveyor, said first air nozzle means being located on one side of said conveyor and said second air nozzle means being located on the opposite side of said conveyor downstream of said first air nozzle means.

11. A material handling apparatus for objects having one open end larger in diameter than the opposite end thereof, said apparatus comprising a conveyor having transversely extending object-receiving recesses formed on its conveying surface, and object reversing means operably associated with said conveyor to reverse and retain improperly aligned objects in said recesses, said object reversing means including a first air nozzle means and a second air nozzle means adjacent said conveyor, said first air nozzle means being located downstream in relation to said conveyor a predetermined distance from said second air nozzle means, said object reversing means also including a deflector means mounted adjacent said conveyor to prevent objects from being thrown off said conveyor when flipped in said recesses by one of said air nozzle means.

12. The structure of claim 11 wherein said deflector means is mounted adjacent said first air nozzle means.

13. The structure of claim 12 wherein guide means are provided adjacent said conveyor to direct toward the center portion of said recesses, objects improperly positioned by said air nozzle means.

14. The structure of claim 13 wherein means are further provided to remove objects from said conveyor which are straddling said recesses.

15. The structure of claim 14 wherein said means to remove straddling objects is a third air nozzle means positioned downstream of said first and second air nozzle means to provide a jet of air under pressure across the top of said recesses to blow any object thereon off the conveyor.

16. The structure of claim 14 wherein said means to remove straddling objects from said conveyor is a deflector member supported adjacent the top of said recesses to engage and guide off said conveyor any object lying on top of said recesses.

17. A material handling apparatus for objects having one open end larger in diameter than the opposite end thereof, said apparatus comprising a conveyor having transversely extending object-receiving recesses formed on its conveying surface, object reversing means operably associated with said conveyor to reverse and retain improperly aligned objects in said recesses, said object reversing means including air nozzle means and a deflector means, said deflector means being mounted adjacent said conveyor to prevent objects from being thrown off said conveyor as said objects are being reversed by said air nozzle means and a second air nozzle means downstream from said air nozzle reversing means positioned to supply a jet of air under pressure across the top of said recesses to blow any object straddling thereon off said conveyor.

18. A material handling apparatus for objects having one open end larger in diameter than the opposite end thereof, said apparatus comprising a conveyor having transversely extending objects-receiving recesses formed on its conveying surface, object reversing means operably associated with said conveyor to reverse and retain improperly aligned objects in said recesses, said object reversing means including a first air nozzle means and a second air nozzle means adjacent said conveyor and a door member downstream from said air nozzle reversing means and supported adjacent the top of said recesses to engage objects straddling said recesses and hold them in this position until an empty recess passes thereunder in which the held object will drop.

19. The structure of claim 18 wherein means are provided to pivotally spring load said door member to allow said door member to pivot away from said conveyor upon jamming of objects between said conveyor and said door member to let the jammed objects pass thereunder.

20. The structure of claim 19 wherein said means to remove objects from the top of said recesses further includes a deflector member supported adjacent the top of said recesses downstream of said door member to guide said objects passing under said door member off said conveyor.

References Cited by the Examiner
UNITED STATES PATENTS

| | | | |
|---|---|---|---|
| 2,974,774 | 3/1961 | Stuart | 198—33.3 |
| 3,006,457 | 9/1961 | Weiss | 198—188 |
| 3,012,651 | 12/1961 | Hawkes | 221—157 |
| 3,101,932 | 8/1963 | Wyle | 221—173 |

EVON C. BLUNK, *Primary Examiner.*

RICHARD E. AEGERTER, HUGO O. SCHULZ,

*Examiners.*